(12) United States Patent
Tertinek

(10) Patent No.: US 9,867,155 B1
(45) Date of Patent: Jan. 9, 2018

(54) AMPLITUDE-MODULATION SIGNAL AND PHASE-MODULATION SIGNAL DELAY ADJUSTMENT FOR POLAR TRANSMITTER

(71) Applicant: Intel IP Corporation, Santa Clara, CA (US)

(72) Inventor: Stefan Tertinek, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/268,955

(22) Filed: Sep. 19, 2016

(51) Int. Cl.
*H04L 27/00* (2006.01)
*H04W 56/00* (2009.01)
*H04L 1/24* (2006.01)
*H04W 84/04* (2009.01)

(52) U.S. Cl.
CPC .......... *H04W 56/003* (2013.01); *H04L 1/246* (2013.01); *H04W 84/042* (2013.01)

(58) Field of Classification Search
USPC ......... 375/232, 295, 296; 455/102, 113, 108
See application file for complete search history.

(56) References Cited

U.S. PATENT DOCUMENTS

| 8,223,883 | B2* | 7/2012 | Matsuura | H04B 1/0475 375/235 |
| 8,477,870 | B2* | 7/2013 | Maeda | H03F 1/0205 375/130 |
| 9,413,583 | B2* | 8/2016 | Belitzer | H04L 27/361 |
| 2006/0067427 | A1 | 3/2006 | Zolfaghari | |
| 2006/0234652 | A1* | 10/2006 | Oka | H03F 1/0205 455/102 |
| 2006/0246856 | A1* | 11/2006 | Udagawa | H03F 1/02 455/108 |
| 2007/0009062 | A1* | 1/2007 | Matsuura | H04L 27/361 375/296 |
| 2008/0205571 | A1 | 8/2008 | Muhammad | |
| 2008/0261543 | A1* | 10/2008 | Hara | H04B 1/0483 455/113 |

(Continued)

OTHER PUBLICATIONS

International Search Report and Written Opinion dated Nov. 6, 2017 in connection with International Patent Application No. PCT/US2017/046882.

*Primary Examiner* — Eva Puente
(74) *Attorney, Agent, or Firm* — Eschweiler & Potashnik, LLC

(57) ABSTRACT

Methods and apparatus for calibrating a polar transmitter are provided. Calibration circuitry is configured to generate an adjustment signal that communicates an amplitude modulation/phase modulation (AMPM) delay value to AMPM delay circuitry that is configured to delay, based at least on the AMPM delay value, output of a signal by digital signal processing circuitry (DSP) in the polar transmitter. The calibration circuitry includes signal generation circuitry, estimation circuitry, and delay circuitry. The signal generation circuitry is configured to generate a calibration signal to control the polar transmitter to generate a calibration transmit signal. The estimation circuitry is configured to receive a result signal that is based on the calibration transmit signal and estimate the AMPM delay value based at least on the result signal. The delay circuitry is configured to provide an adjustment signal to communicate the estimated AMPM delay value to the AMPM delay circuitry.

23 Claims, 4 Drawing Sheets

(56) References Cited

U.S. PATENT DOCUMENTS

| | | | |
|---|---|---|---|
| 2010/0105341 A1* | 4/2010 | Chen | H03C 5/00 |
| | | | 455/102 |
| 2010/0283654 A1* | 11/2010 | Waheed | G04F 10/005 |
| | | | 341/166 |
| 2011/0059704 A1 | 3/2011 | Norimatsu | |
| 2012/0177094 A1 | 4/2012 | Chang | |
| 2015/0146769 A1* | 5/2015 | Omer | H04L 25/03159 |
| | | | 375/232 |

* cited by examiner

AMPLITUDE-MODULATION SIGNAL AND PHASE-MODULATION SIGNAL DELAY ADJUSTMENT FOR POLAR TRANSMITTER

FIELD

The present disclosure relates to the field of radio frequency (RF) transceivers and in particular to methods and apparatus for synchronizing amplitude modulation signals with phase modulation LO signals in a polar transmitter.

BACKGROUND

The polar transmitter is a prevalently used transmitter architecture for cellular transceivers due to the polar transmitter's higher power efficiency as compared to a Cartesian or IQ transmitter. A polar transmitter includes two parallel paths: a phase path that generates a phase modulation signal (PM path) and an amplitude path that generates an amplitude modulation signal (AM path). The PM path includes phase modulator circuitry that processes a frequency or phase component of a polar data sample to generate a phase modulated RF signal. The AM path includes circuitry that processes a magnitude component of the polar data sample to generate an amplitude modulation signal. In a polar transmitter, a radio frequency digital to analog converter (RFDAC) or mixer combines the phase modulated RF signal with the amplitude modulation signal to produce an RF signal that encodes the data sample.

DETAILED DESCRIPTION

Figure 1:
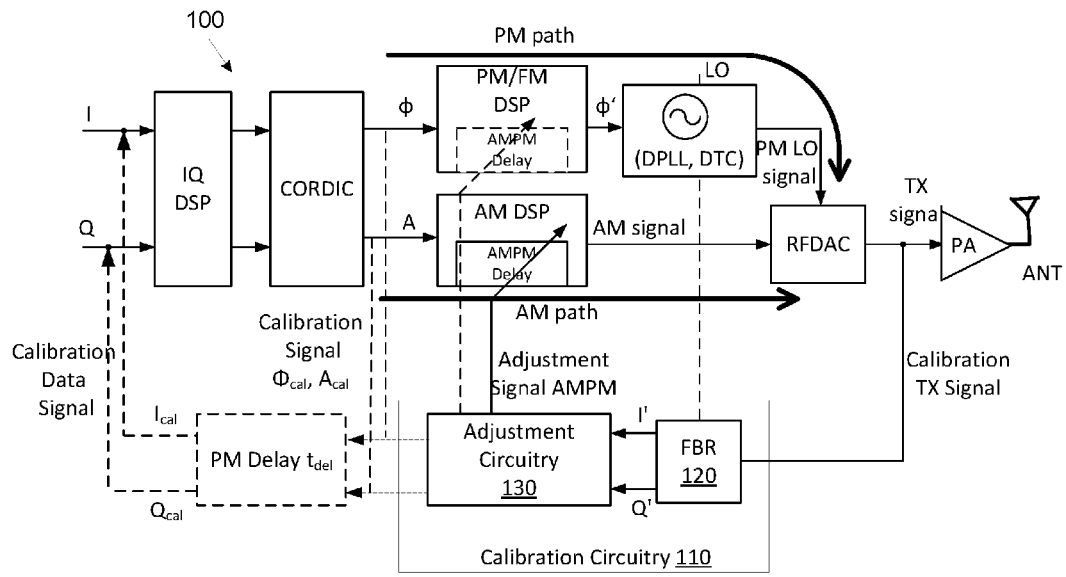
FIG. 1 illustrates an exemplary polar transmitter system that includes calibration circuitry in accordance with various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry" and the like are intended to refer to a computer-related entity, hardware, software (e.g., in execution), and/or firmware. For example, a circuitry can be a circuit, a processor, a process running on a processor, a controller, an object, an executable, a program, a storage device, and/or a computer with a processing device.

FIG. 1 illustrates an architecture of one example embodiment of a polar transmitter 100. The polar transmitter 100 inputs an IQ data point that includes an I component and a Q component. The IQ data point specifies a point on the Cartesian plane that communicates a symbol or other information. IQ digital signal processing circuitry (DSP) filters and upsamples the IQ data point. The filtered and upsampled IQ data point is input to conversion circuitry that converts the IQ data point to a polar data point that specifies the same point as the IQ data point. The polar data point includes an amplitude component "A" and a phase component "φ". In one embodiment, the conversion circuitry is a Coordinate Rotation Digital Computer (CORDIC).

The polar transmitter 100 includes an AM path that processes the amplitude component A to generate an amplitude modulation (AM) signal and a PM path that processes the phase component φ to generate a phase modulated (PM) local oscillator (LO) signal. The AM path and the PM path are indicated generally by the bold arrows in FIG. 1. The AM path includes AM digital signal processing components (DSP). The PM path includes phase modulation and/or frequency modulation digital signal processing components (PM/FM DSP) that convert the phase component φ to a control signal φ' for a digital phase locked loop (DPLL) or a digital to time converter (DTC). The DPLL/DTC modulates an (LO) signal based on the control signal φ' to generate the PM LO signal. The PM LO signal is a phase modulated square or sine wave. The RFDAC combines the AM signal and the PM signal to generate a transmit (TX) signal which is a modulated carrier wave that is amplified by a power amplifier (PA) and transmitted by an antenna (ANT).

A significant challenge in polar transmitter architecture is the accurate time alignment of the AM signal and the PM LO signal before the signals are combined. A misalignment of the AM path and the PM path leads to increased adjacent channel leakage ratio (ACLR), with little impact on the transmitter error vector magnitude (EVM). The signal delay through by the AM path is determined by the delay through the AM DSP as well as the mixed signal RFDAC. The signal delay through the PM path is determined by the PM/FM DSP and the mixed signal DPLL/DTC and RFDAC. Due to its relative simplicity, the AM path typically introduces less delay than the phase path. The alignment of the AM signal with the PM signal is often performed by tunable AMPM delay circuitry in the AM DSP. The AMPM delay circuitry introduces a selected amount of delay (e.g., additional seconds or clock cycles or fractions of seconds or clock cycles) into the AM path. The amount of delay is controlled by an AMPM value stored in, or otherwise accessible by, the AMPM delay circuitry. In one embodiment, the AMPM delay circuitry includes a fractional all-pass filter (i.e., a filter with constant magnitude response and linear phase response). The AMPM delay circuitry holds an internal signal in the AM DSP by the amount of time specified by the AMPM prior to outputting the AM signal that results from the internal signal. In one embodiment, as shown in dashed lines in FIG. 1, the AMPM delay circuitry is disposed in the PM path or in other embodiments the AMPM delay circuitry is disposed in both the AM path and the PM path.

Some existing polar transmitters include firmware that extracts an optimal AMPM value from a memory table. The optimal AMPM value changes depending on transmission mode (e.g., 3G, 4G, TDSC) and frequency band, which means that different AMPM values are stored for all different combinations of mode and band in which the transmitter will operate. The memory table is populated with an optimal AMPM value that was determined for each mode and band combination during a chip characterization in a laboratory setting. As the number of possible mode and band combinations grows, the memory table grows as well, resulting in larger chip size to accommodate the memory. During transmitter operation, the optimal AMPM value is selected by the firmware based on present mode and band of the transmitter. When any change is made to the transmitter hardware or architecture, or new modes or bands are put into use, the firmware and memory table are updated in the laboratory, resulting in increased verification time.

The polar transmitter 100 illustrated in FIG. 1 includes calibration circuitry 110. In various embodiments, the calibration circuitry 110 is configured to generate either a calibration signal or a calibration data signal. The calibration signal is provided directly to the AM DSP and the PM/FM DSP, while the calibration data signal is provided to the IQ DSP. After processing by the IQ DSP and the CORDIC, the calibration data signal results in the desired calibration signal. The calibration circuitry 110 then determines an AMPM delay value based on a calibration TX signal generated by the polar transmitter 100 in response to the calibration signal or the calibration data signal. In general, the calibration circuitry 110 solves for an AMPM delay value that equals the PM delay experienced by data signals I and Q when being processed by the two signal paths. The PM delay that is actually experienced by the data signals is illustrated schematically in dashed lines in a path between an input to the IQ DSP and the calibration circuitry 110. In this manner, the calibration circuitry 110 does not rely on stored AMPM delay values, eliminating the need for the mode and band dependent AMPM value table and associated firmware as well as the lengthy process of extracting optimal AMPM values in the laboratory. Thus, the polar transmitter 100 saves memory and processing power as compared to a polar transmitter that utilizes the firmware and memory table technique for selecting an AMPM value.

Figure 1A:
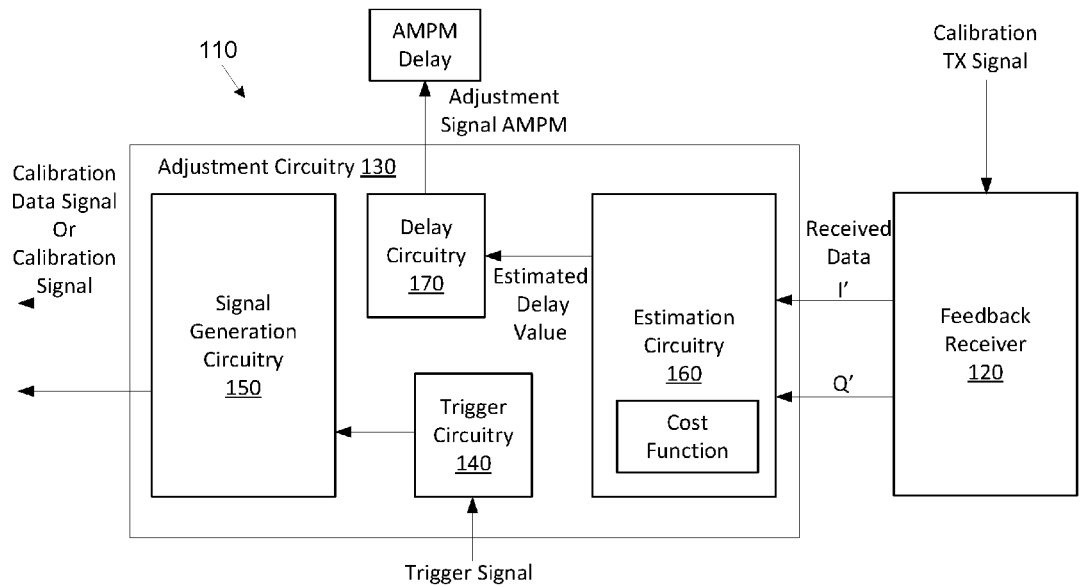
FIG. 1A illustrates an example embodiment of calibration circuitry of FIG. 1.

FIG. 1A illustrates one embodiment of the calibration circuitry 110 in more detail. The various components of the calibration circuitry 110 that are illustrated in FIG. 1A may be implemented in hardware, software in execution by a processor, and/or firmware. The calibration circuitry 110 includes a feedback receiver 120 and adjustment circuitry 130. The adjustment circuitry 130 includes trigger circuitry 140 configured to receive a trigger signal, and in response actuate signal generation circuitry 150 to generate the calibration data signal or the calibration signal. The functioning of the trigger circuitry 140 will be described in more detail with respect to FIG. 3.

In one embodiment, the signal generation circuitry 150 is configured to generate a calibration data signal and input the calibration data signal to the IQ DSP of the polar transmitter. The calibration data signal communicates predetermined calibration data $I_{cal}$, $Q_{cal}$, which has been selected to cause the IQ DSP and CORDIC to generate a predetermined calibration signal $A(t)$, $\varphi(t)$. In some embodiments, rather than generating the calibration data signal and inputting the calibration data signal to the IQ DSP, the signal generation circuitry 150 generates the calibration signal $A_{cal}(t)$, $\varphi_{cal}(t)$ that encodes the calibration $I_{cal}$, $Q_{cal}$ directly and provides the calibration signal to the input of the PM/FM DSP and AM DSP. Several example calibration signals will be discussed below; however, any calibration signal may be the basis for the calibration techniques described herein. In general, the I component of the calibration signal may be expressed as:

$$I(t) = A(t)\cos \varphi(t) \qquad \text{EQ. 1}$$

Figure 2:
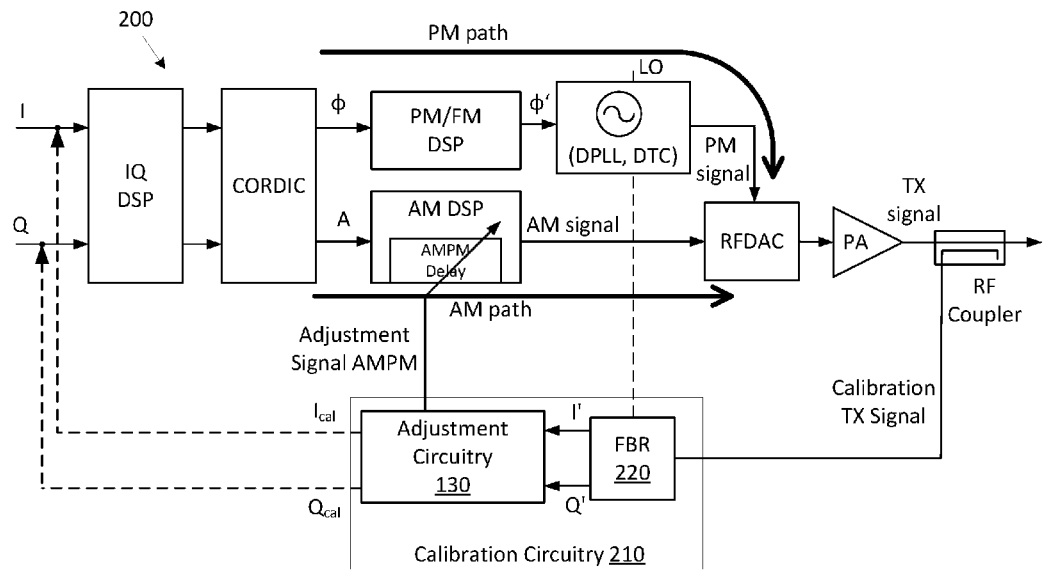
FIG. 2 illustrates another exemplary polar transmitter system that includes calibration circuitry in accordance with various aspects described.

The feedback receiver 120 is configured to down convert the calibration TX signal, which is at the carrier frequency, to the baseband frequency and extract received data I', Q'. In one embodiment, the calibration TX signal input by the feedback receiver 120 is the output of the RFDAC as shown in FIG. 1. In another embodiment illustrated in FIG. 2, the calibration TX signal input by the feedback receiver is the output of a power amplifier that amplifies the output of the RFDAC prior to transmission of the TX signal by the antenna. In this embodiment, the calibration TX signal may be obtained using an RF coupler. In one embodiment, the feedback receiver 120 is the same component as a feedback receiver used for transmitter power control during normal operation of the transmitter 100. The feedback receiver 120 generates a result signal that communicates the received data I', Q' and transmits the result signal to estimation circuitry 160.

For the purposes of this description, only the I component of the calibration signal will be utilized for calibration purposes. In other embodiments, the Q components of the calibration signal may be used instead of, or in addition to, the I component in an analogous way.

If the AM path and the PM path are misaligned (i.e., one path imparts more delay than the other path) the received data I', Q' in the calibration TX signal will be distorted, meaning that the received data I', Q' will not match the calibration data $I_{cal}$, $Q_{cal}$ that was encoded in the calibration signal. The I component of the down converted calibration TX signal can be expressed generally as:

$$I'(t) = A(t+t_{ampm})\cos \varphi(t+t_{del}) \qquad \text{EQ. 2}$$

The term $t_{ampm}$ indicates the adjustable amount of delay that is introduced into the AM path by the AMPM delay circuitry when a particular AMPM delay value is used. The term $t_{del}$ indicates the "actual delay" experienced by the calibration data signal as it is processed in the AM and PM paths in the polar transmitter to generate the transmit TX signal. It can be seen that when $t_{ampm}$ is equal to $t_{del}$, the I component of the down converted calibration TX signal, I', will match the I component of the calibration data, I, that was encoded in the calibration signal.

The estimation circuitry 160 is configured to input the result signal extracted by the feedback receiver 120 and estimate the AMPM delay value based at least on the result signal. In general, the estimation circuitry 160 is configured to determine an AMPM delay value that will result in $t_{ampm}$ being equal to $t_{del}$. The estimation circuitry 160 is configured to provide this estimated AMPM delay value to delay circuitry 170. The delay circuitry 170 is configured to provide an adjustment signal that communicates the estimated AMPM delay value to the AMPM delay circuitry in some way. For example, the adjustment signal may cause the AMPM delay value to be stored in a memory or a register that is accessed by the AMPM delay circuitry during transmitter operation. The adjustment signal may cause the AMPM delay circuitry to make circuit modifications to implement the AMPM delay value.

In one embodiment, the estimation circuitry 160 is configured to use a cost function that is a function of the result signal to determine the AMPM delay value. The cost function is selected based on the calibration signal being used. Several calibration signal/cost function combinations will now be described. However, other calibration signal/cost functions may be used in accordance with aspects described herein.

In one embodiment, the calibration signal $A_{cal}(t)$, $\Phi_{cal}(t)$ is:

$$A_{cal}(t) = \sin \omega_0 t \qquad \text{EQ. 3}$$

$$\Phi_{cal}(t) = \omega_0 t \qquad \text{EQ. 4}$$

This calibration signal corresponds to a periodic amplitude modulation with an additional frequency offset at $\omega_0 = 2\pi/T$. Such a signal may be generated by applying a sine wave of frequency $\omega_0$ at the RFDAC and a frequency offset of magnitude $\omega_0$ at the DPLL. The I component of the received signal (e.g., the down converted calibration TX signal) becomes:

$$I'(t) = \sin(\omega_0 t + \omega_0 t_{ampm})\cos(\omega_0 t + \omega_0 t_{del}) \quad \text{EQ. 5}$$

When the calibration signal expressed in equations 3 and 4 is used, the following cost function J may be used by the estimation circuitry 160:

$$J(t_{ampm}) = \frac{1}{T}\int_0^T I'(t)dt \quad \text{EQ. 6}$$

Because sin(x) and cos(x) are orthogonal, the integral will be zero when the tunable AMPM delay compensates the PM delay (e.g., $t_{ampm} = t_{del}$). Thus, the estimation circuitry 160 will solve for a value of $t_{ampm}$ that will cause the cost function in equation 6 to be zero, meaning that the cost function is within some acceptable margin of zero. In other embodiments, the estimation circuitry 160 solves for a value of $t_{ampm}$ that minimizes the cost function. The value of AMPM that produces $t_{ampm}$ will be the AMPM delay value communicated by the delay circuitry 170 to the AMPM delay circuity in the transmitter.

In addition to the sinusoidal calibration signal just discussed, other calibration signals may be employed. The calibration signal may be any periodic signal of predefined period, such as a sinusoid or triangular signal. The calibration signal may be an amplitude signal and a phase signal such that the amplitude signal and the cosine (or the sine) of the phase signal are orthogonal. For example, the calibration signal may be a periodic amplitude signal and linear phase signal, or as discussed above, such as a sinusoidal amplitude signal and a linear phase signal.

The calibration signal may be a random signal with predefined statistical properties (e.g., mean, variance, autocorrelation function). The calibration signal may be a random amplitude signal and a random phase signal such that the calibration signal $I_{cal}$ (or $Q_{cal}$) has maximum correlation with the received calibration signal $I'$ (or $Q'$) when they are time aligned.

The cost function $J(t_{ampm})$ may be a function that reaches a minimum or zero when $t_{ampm} = t_{del}$. The cost function may be a linear or nonlinear function of $I_{cal}$, $I'$, $Q_{cal}$, $Q'$, or an integral function of a function h of $I_{cal}$, $I'$, $Q_{cal}$, and/or $Q'$:

$$J(t_{ampm}) = \frac{1}{T}\int_{t_0}^{t_0+T} h(Ical(t), Qcal(t), I'(t), Q'(t))dt \quad \text{EQ. 7}$$

Where the arbitrary real numbers $t_0$ and T are the starting point and period of integration, respectively. The period of the integration T may correspond to the period T of a periodic calibration signal. For example, the cost function may be the function expressed in Equation 7 where h is any of the following functions:

$$h(*) = I'(t) \quad \text{EQ. 8}$$

$$h(*) = Q'(t) \quad \text{EQ. 9}$$

$$h(*) = I'(t)Q'(t) \quad \text{EQ. 10}$$

$$h(*) = I'(t)I_{cal}(t) \quad \text{EQ. 11}$$

Another possible cost function is the cross-correlation function:

$$J(t_{ampm}, \tau) = \lim_{T\to\infty} \frac{1}{2T}\int_{-T}^{T} I'(t)Ical(t+\tau)dt \quad \text{EQ. 12}$$

$$J(t_{ampm}, \tau) = \lim_{T\to\infty} \frac{1}{2T}\int_{-T}^{T} Q'(t)Qcal(t+\tau)dt \quad \text{EQ. 13}$$

Where $\tau$ is an arbitrary number, for example 0. This type of cost function may be used for random calibration signals.

Figure 3:
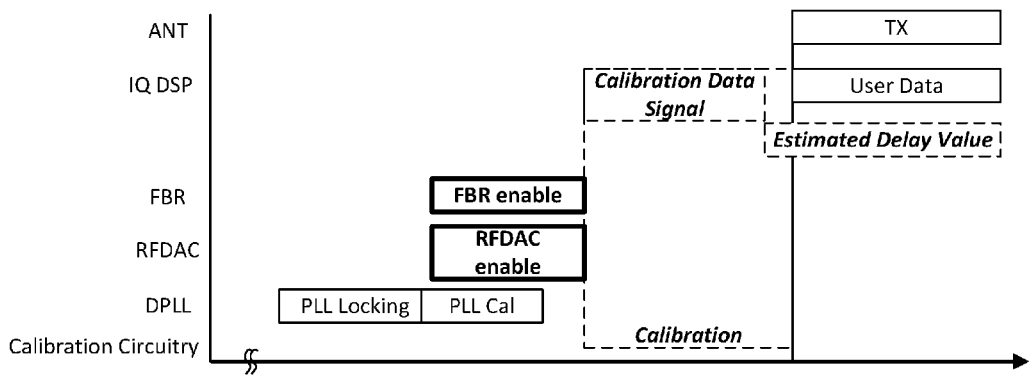
FIG. 3 illustrates an exemplary timing diagram for the calibration circuitry of FIGS. 1 and 2.

FIG. 3 illustrates a timing diagram of the power up cycle of the polar transmitter 100 of FIG. 1, including the calibration circuitry 110. When the power is first turned on, the DPLL enters a locking phase in which the DPLL is adjusted to produce the desired LO frequency and the feedback loop is brought into the DPLL to lock in the LO signal. The DPLL then enters a calibration phase in which internal DPLL calibrations are made, such as digitally controlled oscillator (DCO) gain estimation, and so on. While the DPLL is in the calibration phase, the feedback receiver (FBR) and RFDAC go through an enabling process. The FBR and RFDAC each generate an enablement signal at the end of the enabling process to indicate to the transmitter that these components are ready to operate. In one embodiment, the enablement signal from the FBR and/or the RFDAC is the trigger signal input by the trigger circuitry 140 of FIG. 1A. Of course, other trigger signals that occur during the calibration phase of the polar transmitter 100 may be used as trigger signals.

Once the RFDAC and feedback receiver are both enabled, the calibration circuitry 110 begins a calibration process by generating either the calibration data signal or calibration signal, receiving the calibration TX signal, and estimating the AMPM delay value as described above with respect to FIGS. 1 and 1A. During the calibration process, the calibration data signal is applied to the IQ DSP or the calibration signal is provided directly to the AM DSP and the PM/FM DSP. The estimated AMPM delay value is stored inside, or otherwise communicated to, the AMPM delay circuitry. After the AMPM delay value has been stored, the transmitter enters normal operation in which user data is provided to the IQ DSP, the AMPM delay circuitry (in the AM DSP and/or the PM/FM DSP) adds the amount of delay specified by the estimated AMPM delay value, and the antenna transmits the resulting transmit signal.

Figure 4:
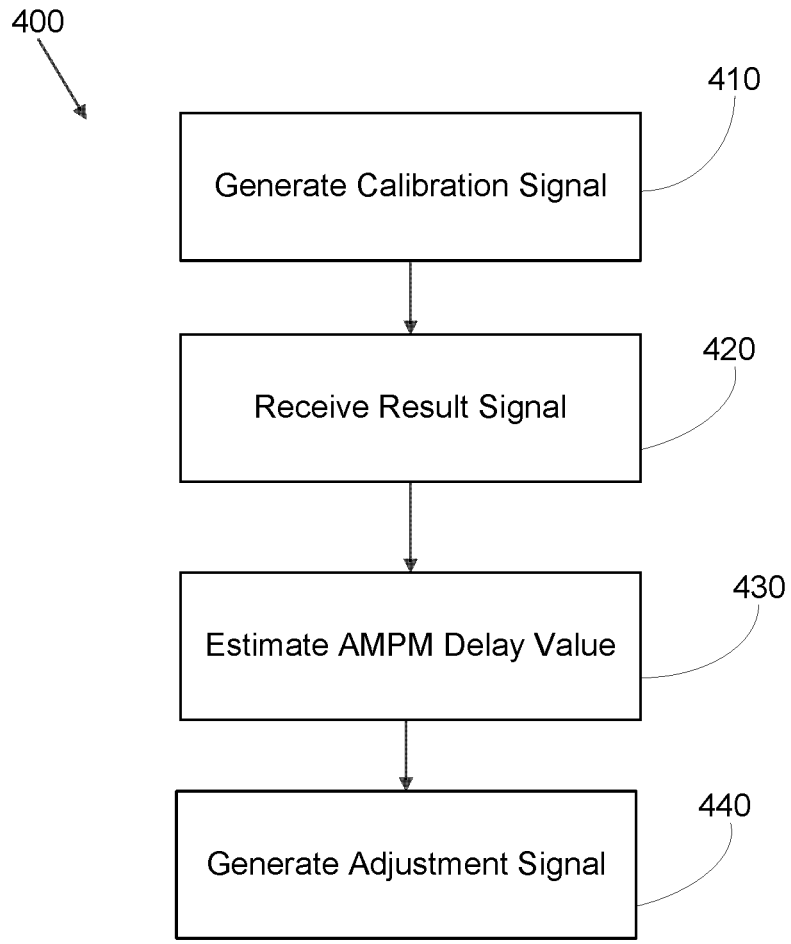
FIG. 4 illustrates a flow diagram of an exemplary method for adjusting AMPM delay circuitry of a polar transmitter in accordance with various aspects described.

FIG. 4 illustrates a flow diagram 400 that outlines a method for generating an adjustment signal that communicates an amplitude modulation/phase modulation (AMPM) delay value to AMPM delay circuitry that delays, based at least on the AMPM delay value, output of a signal by digital signal processing circuitry (DSP) in a polar transmitter. In one embodiment, the method described by flow diagram 400 may be performed by calibration circuitry 110 of FIGS. 1-3. At 410, the method includes generating a calibration signal. Operation 410 may be performed by the signal generation circuitry 150 of FIG. 1A. The calibration data signal is input to a polar transmitter to cause the polar transmitter to generate a calibration transmit signal in response to the calibration data signal. At 420, a result signal based on (e.g., extracted from) the calibration transmit signal is received and, at 430, the AMPM delay value is estimated based at least on the result signal. Operations 420 and 430 may be performed by the estimation circuitry 160 of FIG. 1A. At 440, the method includes generating an adjustment signal that controls AMPM delay circuitry to delay a signal output by a DSP based at least on the estimated AMPM delay value. Operation 440 may be performed by the delay circuitry 170 of FIG. 1A.

Figure 5:
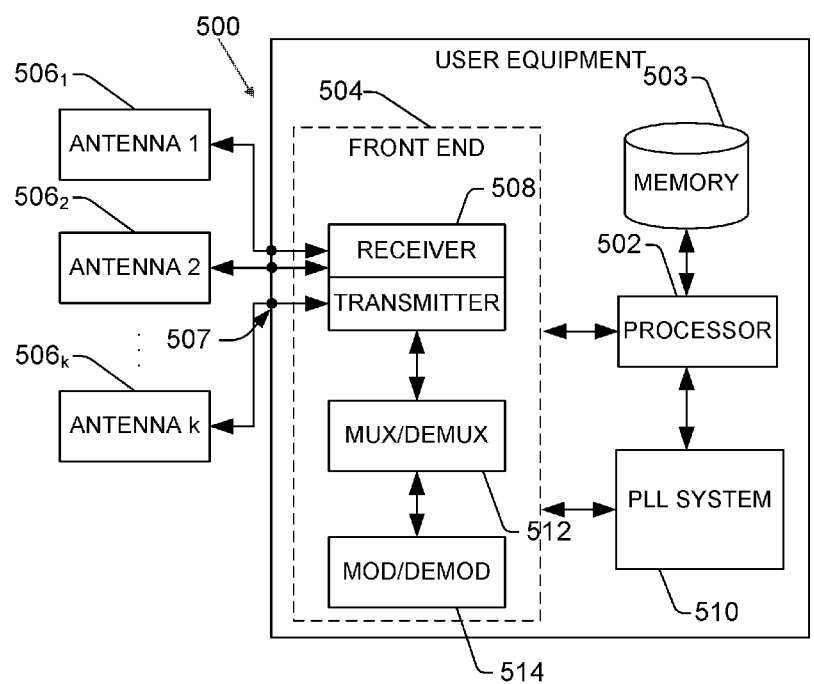
FIG. 5 illustrates an example user equipment device that includes calibration circuitry in accordance with various aspects described.

To provide further context for various aspects of the disclosed subject matter, FIG. 5 illustrates a block diagram of an embodiment of user equipment 500 (e.g., a mobile device, communication device, personal digital assistant, etc.) related to access of a network (e.g., base station, wireless access point, femtocell access point, and so forth) that can enable and/or exploit features or aspects of the disclosed aspects.

The user equipment or mobile communication device 500 can be utilized with one or more aspects of the PLLs devices described herein according to various aspects. The user equipment device 500, for example, comprises a digital baseband processor 502 that can be coupled to a data store or memory 503, a front end 504 (e.g., an RF front end, an acoustic front end, or the other like front end) and a plurality of antenna ports 507 for connecting to a plurality of antennas $506_1$ to $506_k$ (k being a positive integer). The antennas $506_1$ to $506_k$ can receive and transmit signals to and from one or more wireless devices such as access points, access terminals, wireless ports, routers and so forth, which can operate within a radio access network or other communication network generated via a network device (not shown).

The user equipment 500 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters (e.g. transceivers) 508, a mux/demux component 512, and a mod/demod component 514. The front end 504 is coupled to the digital baseband processor 502 and the set of antenna ports 507, in which the set of antennas 5061 to 506k can be part of the front end. In one aspect, the user equipment device 500 can comprise a phase locked loop system 510.

The processor 502 can confer functionality, at least in part, to substantially any electronic component within the mobile communication device 500, in accordance with aspects of the disclosure. As an example, the processor 500 can be configured to execute, at least in part, executable instructions that estimate the AMPM delay value for the transceiver 508 and/or generate a calibration signal. Thus the processor 500 may embody various aspects of the calibration circuitry 110 of FIGS. 1-3.

The processor 502 is functionally and/or communicatively coupled (e.g., through a memory bus) to memory 503 in order to store or retrieve information necessary to operate and confer functionality, at least in part, to communication platform or front end 504, the phase locked loop system 510 and substantially any other operational aspects of the phase locked loop system 510. The phase locked loop system 510 includes at least one oscillator (e.g., a VCO, DCO or the like) that can be calibrated via core voltage, a coarse tuning value, signal, word or selection process.

The processor 502 can operate to enable the mobile communication device 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, interpacket times, etc. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation. Memory 503 may include a static random access memory (SRAM) that stores calibration data and/or a cost function for use by calibration circuitry 110 of FIGS. 1-3).

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a calibration circuitry that includes signal generation circuitry, estimation circuitry, and delay circuitry. The signal generation circuitry is configured to generate a calibration signal to control a polar transmitter to generate a calibration transmit signal. The estimation circuitry is configured to receive a result signal based on the calibration transmit signal and estimate an amplitude modulation/phase modulation (AMPM) delay value based at least on the result signal. The delay circuitry is configured to generate an adjustment signal to control an AMPM delay circuitry to delay a signal output by a digital processing circuitry (DSP) based at least on the estimated AMPM delay value.

Example 2 includes the subject matter of example 1, including or omitting optional elements, and further includes a feedback receiver configured to receive the calibration transmit signal; down convert the calibration transmit signal to a baseband frequency; extract received data from the down converted calibration signal; generate the result signal based at least on the extracted received data; and provide the result signal to the estimation circuitry.

Example 3 includes the subject matter of example 1, including or omitting optional elements, wherein the transmit signal comprises a signal output by a radio frequency digital to analog converter that combines the AM signal with a phase modulated (PM) local oscillator (LO) signal.

Example 4 includes the subject matter of example 1, including or omitting optional elements, wherein the transmit signal comprises a signal output by a power amplifier that amplifies an output of a radio frequency digital to analog converter that combines the AM signal with a phase modulate (PM) local oscillator (LO) signal.

Example 5 includes the subject matter of example 1, including or omitting optional elements, further including trigger circuitry configured to receive a trigger signal that occurs during a calibration phase of the polar transmitter and, in response, cause the signal generation circuitry to generate the calibration data signal.

Example 6 includes the subject matter of example 1, including or omitting optional elements, wherein the signal generation circuitry is configured to generate a calibration data signal encoding I and Q values that, when processed by an IQ DSP and Coordinate Rotation Digital Computer (CORDIC) in the polar transmitter, will result in the calibration signal and provide the calibration data signal to the IQ DSP.

Example 7 includes the subject matter of example 1, including or omitting optional elements, wherein the signal generation circuitry is configured to generate the calibration signal and provide the calibration signal to AM DSP and PM/FM DSP in the polar transmitter.

Example 8 includes the subject matter of examples 1-7, including or omitting optional elements, wherein the estimation circuitry is configured to estimate the AMPM delay value based at least on a cost function that is a function of either the result signal or the calibration data signal.

Example 9 includes the subject matter of example 8, including or omitting optional elements, wherein the calibration signal comprises a periodic signal such that an I component of the result signal includes a product of orthogonal functions; the cost function includes a summation of the result signal over a period of the result signal; and the estimation circuitry is configured to select an AMPM delay value that causes the cost function to be zero or to attain a minimum value.

Example 10 includes the subject matter of example 8, including or omitting optional elements, wherein the calibration signal includes a random signal having a predefined statistical property; the cost function includes a cross correlation function between the calibration signal and the result signal; and the estimation circuitry is configured to select an AMPM delay value that causes the cost function to be zero or to attain a minimum value.

Example 11 includes the subject matter of examples 1-7, including or omitting optional elements, wherein the AMPM delay circuitry is disposed in an AM path of the polar transmitter such that the AMPM delay circuitry delays, based at least on the AMPM delay value, output of an AM signal by AM digital signal processing circuitry (DSP) in the AM path of the polar transmitter.

Example 12 includes the subject matter of examples 1-7, including or omitting optional elements, wherein the AMPM delay circuitry is disposed in a phase modulation/frequency modulation (PM/FM) path of the polar transmitter such that the AMPM delay circuitry delays, based at least on the AMPM delay value, output of a PM/FM signal by PM/FM digital signal processing circuitry (DSP) in the PM/FM path of the polar transmitter.

Example 13 is a method that includes generating a calibration signal to control a polar transmitter to generate a calibration transmit signal; receiving a result signal based on the calibration transmit signal; estimating an amplitude modulation/phase modulation (AMPM) delay value based at least on the result signal; and generating an adjustment signal to control an AMPM delay circuitry to delay a signal output by a digital signal processing circuitry (DSP) based at least on the estimated AMPM delay value.

Example 14 includes the subject matter of example 13, including or omitting optional elements, further including receiving a trigger signal that occurs during a calibration phase of the polar transmitter and, in response, causing the signal generation circuitry to generate the calibration data signal.

Example 15 includes the subject matter of example 13-14, including or omitting optional elements, wherein estimating includes determining the AMPM delay value based at least on a cost function that is a function of either the result signal or the calibration data signal.

Example 16 is a polar transmitter, including digital signal processing circuitry (DSP) and calibration circuitry. The DSP is arranged in an amplitude modulation path and a phase modulation/frequency modulation path, wherein the DSP is configured to process a baseband signal to generate a phase modulated local oscillator (PM LO) signal and an amplitude modulation signal. The DSP includes amplitude modulation/phase modulation (AMPM) delay circuitry that is configured to delay, based at least on an AMPM delay value, output of a signal by the DSP. The calibration circuitry is configured to generate an adjustment signal that communicates the AMPM delay value to the AMPM delay circuitry by: generating a calibration signal that causes the polar transmitter to generate a desired calibration transmit signal; receiving a result signal extracted from the calibration transmit signal; estimating the AMPM delay value based at least on the result signal; and providing the adjustment signal communicating the estimated AMPM delay value to the AMPM delay circuitry.

Example 17 includes the subject matter of example 16, including or omitting optional elements, further including a feedback receiver configured to: receive the calibration transmit signal; down convert the calibration transmit signal to a baseband frequency; extract received data from the down converted calibration signal; generate the result signal based at least on the extracted received data; and provide the result signal to the estimation circuitry.

Example 18 includes the subject matter of example 16, including or omitting optional elements, wherein the calibration circuitry further includes trigger circuitry configured to receive a trigger signal that occurs during a calibration phase of the polar transmitter and, in response, cause the signal generation circuitry to generate the calibration data signal.

Example 19 includes the subject matter of examples 16-18, including or omitting optional elements, wherein the estimation circuitry is configured to estimate the AMPM delay value based at least on a cost function that is a function of either the result signal or the calibration data signal.

Example 20 includes the subject matter of example 19, including or omitting optional elements, wherein: the calibration signal includes a periodic signal such that an I component of the result signal comprises a product of orthogonal functions; the cost function includes a summation of the result signal over a period of the result signal; and the estimation circuitry is configured to select an AMPM delay value that causes the cost function to be zero.

Example 21 includes the subject matter of example 19, including or omitting optional elements, wherein: the calibration signal comprises a random signal having a predefined statistical property; the cost function includes a cross correlation function between the calibration signal and the result signal; and the estimation circuitry is configured to select an AMPM delay value that causes the cost function to be zero or to attain a minimum value.

Example 22 includes the subject matter of example 19, including or omitting optional elements, wherein the AMPM delay circuitry is disposed in an AM path of the polar transmitter such that the AMPM delay circuitry delays, based at least on the AMPM delay value, output of an AM signal by AM digital signal processing circuitry (DSP) in an AM path of the polar transmitter.

Example 23 includes the subject matter of example 19, including or omitting optional elements, wherein the AMPM delay circuitry is disposed in a phase modulation/frequency modulation (PM/FM) path of the polar transmitter such that the AMPM delay circuitry delays, based at least on the AMPM delay value, output of a PM/FM signal by PM/FM digital signal processing circuitry (DSP) in a PM/FM path of the polar transmitter.

Example 24 is an apparatus, configured to generate an adjustment signal that communicates an amplitude modulation/phase modulation (AMPM) delay value to AMPM delay circuitry that is configured to delay, based at least on the AMPM delay value, output of a signal by digital signal processing circuitry (DSP) in a polar transmitter. The apparatus includes means for generating a calibration signal that causes the polar transmitter to generate a desired calibration transmit signal; means for receiving a result signal extracted from the calibration transmit signal; means for estimating the AMPM delay value based at least on the result signal; and means for providing an adjustment signal that communicates the estimated AMPM delay value to the AMPM delay circuitry.

Example 25 includes the subject matter of example 24, including or omitting optional elements, further including means for receiving a trigger signal that occurs during a calibration phase of the polar transmitter and, in response, causing the signal generation circuitry to generate the calibration data signal.

Example 26 includes the subject matter of examples 24-25, including or omitting optional elements, wherein the means for estimating is configured to determine the AMPM delay value based at least on a cost function that is a function of either the result signal or the calibration data signal.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A calibration circuitry comprising:
signal generation circuitry configured to generate a calibration signal to control a polar transmitter to generate a calibration transmit signal;
estimation circuitry configured to:
 receive a result signal based on the calibration transmit signal; and
 estimate an amplitude modulation/phase modulation (AMPM) delay value based at least on the result signal; and
delay circuitry configured to generate an adjustment signal to control an AMPM delay circuitry to delay a signal output by a digital processing circuitry (DSP) based at least on the estimated AMPM delay value.

2. The calibration circuitry of claim 1, further comprising a feedback receiver configured to:
receive the calibration transmit signal;
down convert the calibration transmit signal to a baseband frequency;
extract received data from the down converted calibration transmit signal;
generate the result signal based at least on the extracted received data; and
provide the result signal to the estimation circuitry.

3. The calibration circuitry of claim 1, wherein the calibration transmit signal comprises a signal output by a radio frequency digital to analog converter that combines an AM signal with a phase modulated (PM) local oscillator (LO) signal.

4. The calibration circuitry of claim 1, wherein the calibration transmit signal comprises a signal output by a power amplifier that amplifies an output of a radio frequency digital to analog converter that combines an AM signal with a phase modulate (PM) local oscillator (LO) signal.

5. The calibration circuitry of claim 1, further comprising trigger circuitry configured to receive a trigger signal that occurs during a calibration phase of the polar transmitter and, in response, cause the signal generation circuitry to generate the calibration signal.

6. The calibration circuitry of claim 1, wherein the signal generation circuitry is configured to:
   generate a calibration data signal encoding I and Q values that, when processed by an IQ DSP and Coordinate Rotation Digital Computer (CORDIC) in the polar transmitter, will result in the calibration signal; and
   provide the calibration data signal to the IQ DSP.

7. The calibration circuitry of claim 1, wherein the signal generation circuitry is configured to:
   generate the calibration signal; and
   provide the calibration signal to AM DSP and PM/FM DSP in the polar transmitter.

8. The calibration circuitry of claim 1, wherein the estimation circuitry is configured to estimate the AMPM delay value based at least on a cost function that is a function of either the result signal or the calibration signal.

9. The calibration circuitry of claim 8, wherein:
   the calibration signal comprises a periodic signal such that an I component of the result signal comprises a product of orthogonal functions;
   the cost function includes a summation of the result signal over a period of the result signal; and
   wherein the estimation circuitry is configured to select an AMPM delay value that causes the cost function to be zero or to attain a minimum value.

10. The calibration circuitry of claim 8, wherein:
    the calibration signal comprises a random signal having a predefined statistical property;
    the cost function includes a cross correlation function between the calibration signal and the result signal; and
    wherein the estimation circuitry is configured to select an AMPM delay value that causes the cost function to be zero or to attain a minimum value.

11. The calibration circuitry of claim 1, wherein an AMPM delay circuitry is disposed in an AM path of the polar transmitter such that the AMPM delay circuitry delays, based at least on the AMPM delay value, output of an AM signal by AM digital signal processing circuitry (DSP) in the AM path of the polar transmitter.

12. The calibration circuitry of claim 1, wherein an AMPM delay circuitry is disposed in a phase modulation/frequency modulation (PM/FM) path of the polar transmitter such that the AMPM delay circuitry delays, based at least on the AMPM delay value, output of a PM/FM signal by PM/FM digital signal processing circuitry (DSP) in the PM/FM path of the polar transmitter.

13. A method comprising:
    generating a calibration signal to control a polar transmitter to generate a calibration transmit signal;
    receiving a result signal based on the calibration transmit signal;
    estimating an amplitude modulation/phase modulation (AMPM) delay value based at least on the result signal; and
    generating an adjustment signal to control an AMPM delay circuitry to delay a signal output by a digital signal processing circuitry (DSP) based at least on the estimated AMPM delay value.

14. The method of claim 13, further including receiving a trigger signal that occurs during a calibration phase of the polar transmitter and, in response, generating the calibration signal.

15. The method of claim 13, wherein estimating comprises determining the AMPM delay value based at least on a cost function that is a function of either the result signal or the calibration signal.

16. A polar transmitter, comprising:
    digital signal processing circuitry (DSP) configured to process a baseband signal to generate a phase modulated local oscillator (PM LO) signal and an amplitude modulation signal,
    wherein the DSP comprises an amplitude modulation/phase modulation (AMPM) delay circuitry configured to delay, based at least on an AMPM delay value, output of a signal by the DSP;
    calibration circuitry configured to generate an adjustment signal to communicate the AMPM delay value to the AMPM delay circuitry by:
       generating a calibration signal to control the polar transmitter to generate a calibration transmit signal;
       receiving a result signal that is based on the calibration transmit signal; and
       estimating the AMPM delay value based at least on the result signal; and
       providing the adjustment signal communicating the estimated AMPM delay value to the AMPM delay circuitry.

17. The polar transmitter of claim 16, further comprising a feedback receiver configured to:
    receive the calibration transmit signal;
    down convert the calibration transmit signal to a baseband frequency;
    extract received data from the down converted calibration transmit signal; and
    generate the result signal based at least on the extracted received data;
    provide the result signal to the calibration circuitry.

18. The polar transmitter of claim 16, wherein the calibration circuitry further comprises trigger circuitry configured to receive a trigger signal that occurs during a calibration phase of the polar transmitter and, in response, cause the signal generation circuitry to generate the calibration signal.

19. The polar transmitter of claim 16, wherein the calibration circuitry is configured to estimate the AMPM delay value based at least on a cost function that is a function of either the result signal or the calibration signal.

20. The polar transmitter of claim 19, wherein:
    the calibration signal comprises a periodic signal such that an I component of the result signal comprises a product of orthogonal functions;
    the cost function includes a summation of the result signal over a period of the result signal; and
    wherein the calibration circuitry is configured to select an AMPM delay value that causes the cost function to be zero.

21. The polar transmitter of claim 19, wherein:
    the calibration signal comprises a random signal having a predefined statistical property;
    the cost function includes a cross correlation function between the calibration signal and the result signal; and wherein the calibration circuitry is configured to select an AMPM delay value that causes the cost function to be zero or to attain a minimum value.

22. The polar transmitter of claim 19, wherein the AMPM delay circuitry is disposed in an AM path of the polar transmitter such that the AMPM delay circuitry delays, based at least on the AMPM delay value, output of an AM signal by AM digital signal processing circuitry (DSP) in an AM path of the polar transmitter.

23. The polar transmitter of claim 19, wherein the AMPM delay circuitry is disposed in a phase modulation/frequency modulation (PM/FM) path of the polar transmitter such that the AMPM delay circuitry delays, based at least on the AMPM delay value, output of a PM/FM signal by PM/FM digital signal processing circuitry (DSP) in a PM/FM path of the polar transmitter.

\* \* \* \* \*